United States Patent
Swank et al.

(10) Patent No.: US 10,473,202 B2
(45) Date of Patent: Nov. 12, 2019

(54) POWER SPLIT TORQUE CONVERTER

(71) Applicant: Schaeffler Technologies AG & CO. KG, Herzogenaurach (DE)

(72) Inventors: Michael G. Swank, Shreve, OH (US); Markus Steinberger, Macedonia, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 801 days.

(21) Appl. No.: 14/481,212

(22) Filed: Sep. 9, 2014

(65) Prior Publication Data

US 2015/0072822 A1    Mar. 12, 2015

Related U.S. Application Data (60) Provisional application No. 61/876,316, filed on Sep. 11, 2013.

(51) Int. Cl.
   *F16H 45/02* (2006.01)

(52) U.S. Cl.
   CPC ..... *F16H 45/02* (2013.01); *F16H 2045/0205* (2013.01); *F16H 2045/0268* (2013.01); *F16H 2045/0278* (2013.01); *F16H 2045/0294* (2013.01)

(58) Field of Classification Search
   None
   See application file for complete search history.

(56) References Cited

U.S. PATENT DOCUMENTS

| | | | |
|---|---|---|---|
| 4,027,757 A | 6/1977 | Radke et al. | |
| 4,867,290 A | 9/1989 | Macdonald et al. | |
| 6,112,869 A * | 9/2000 | Krause | F16D 25/0635 192/213.1 |
| 8,608,604 B1 * | 12/2013 | Jawalkar Nagaraj | F16H 47/08 475/47 |
| 2006/0086584 A1 | 4/2006 | Maucher et al. | |
| 2008/0149441 A1 | 6/2008 | Sturgin | |
| 2011/0099992 A1 | 5/2011 | Magerkurth et al. | |
| 2013/0020166 A1 | 1/2013 | Robinette et al. | |
| 2013/0068580 A1 * | 3/2013 | Doegel | F16F 15/1478 192/3.28 |
| 2013/0085030 A1 * | 4/2013 | Dogel | F16F 15/1478 475/59 |
| 2013/0203541 A1 | 8/2013 | Lorenz et al. | |

* cited by examiner

*Primary Examiner* — Colby M Hansen (57) ABSTRACT

A torque transmission apparatus, including: a first vibration damper with a first input part arranged to receive torque from an engine, a first output part and at least one first spring engaged with the first input and output parts; and a torque converter including a cover non-rotatably connected to the first output part, an impeller with at least one first blade and an impeller shell non-rotatably connected to the cover, a turbine with at least one second blade and a turbine shell, an output hub and a planetary gear set including a first component non-rotatably connected to the turbine shell or a second component non-rotatably connected to the output hub.

20 Claims, 5 Drawing Sheets

PRIOR ART

POWER SPLIT TORQUE CONVERTER

CROSS-REFERENCE TO RELATED APPLICATIONS

This application claims the benefit under 35 U.S.C. § 119(e) of U.S. Provisional Patent Application No. 61/876,316, filed Sep. 11, 2013, which application is incorporated herein by reference in its entirety.

TECHNICAL FIELD

The present disclosure relates to a torque transmission apparatus including a torque converter with a planetary gear set and a vibration damper in an input torque path for the torque converter. Input torque for the torque converter is split at the vibration damper to increase absorber mass and vibration damping for the apparatus.

BACKGROUND

Figure 5:
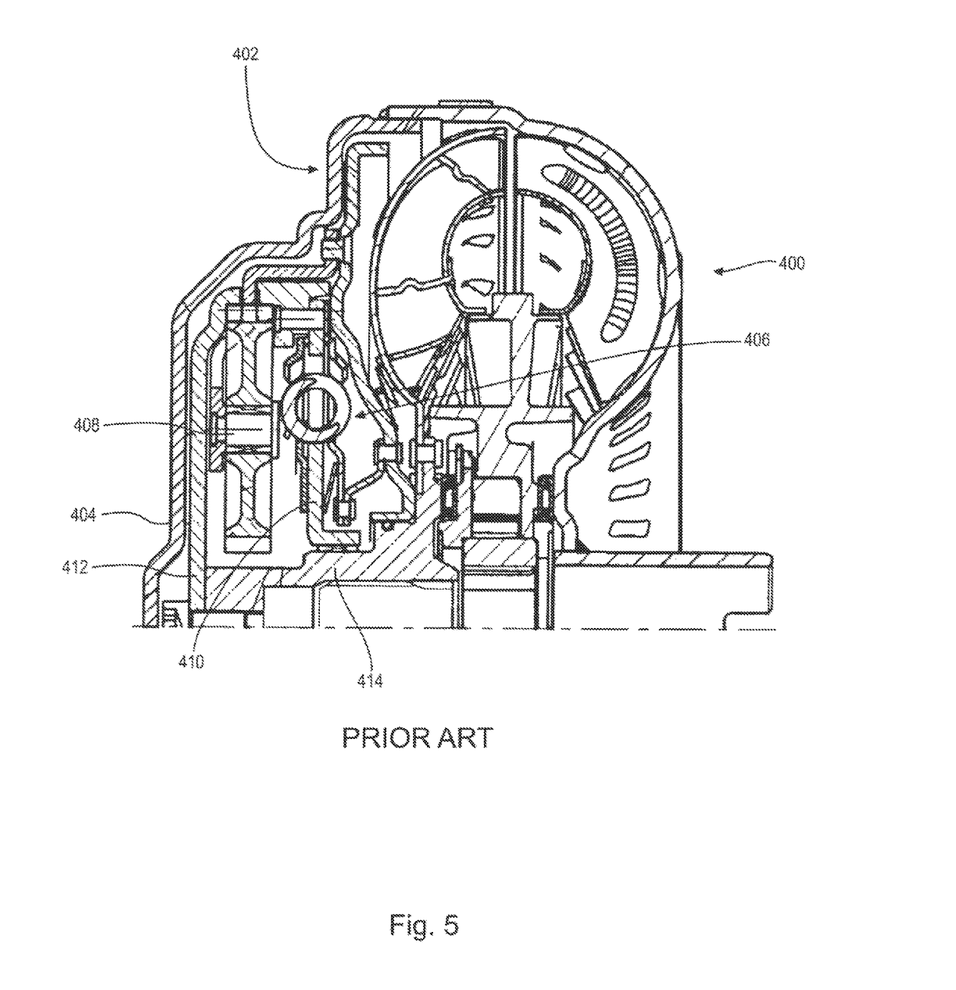
FIG. 5 is a mark-up of FIG. 12 from U.S. Patent Application Publication US 2013/0203541 A1 showing a partial cross-sectional view of a prior art torque converter.

FIG. 5 is a mark-up of FIG. 12 from U.S. Patent Application Publication US 2013/0203541 A1 showing a partial cross-sectional view of prior art torque converter 400. For a vibration damper, for example in a torque converter, absorber mass is defined as the mass associated with the output of the vibration damper. In general, increasing the absorber mass increases the vibration absorbing capacity of the vibration damper. Converter 400 includes torque converter clutch 402. When clutch 402 is closed, torque from cover 404 is split into one path to vibration damper 406 and another path to carrier 408. Flange 410 is the output for damper 406 and the absorber mass for damper 406 is formed by flange 410 and driven ring gear 412, which is connected to output hub 414. The configuration of torque converter 400 results in an increase in absorber mass in comparison with an arrangement in which flange 410 is directly connected to hub 414. However, the increase is not particularly significant. For example, since torque is split inside converter 400, the mass of the cover is not included in the absorber mass.

U.S. Patent Application Publication No. 2013/0020166 discloses use of a planetary gear set within a torque converter having a vibration damper. Input torque for the torque converter is split within the torque converter and an increase in absorber mass results; however, as is the case for torque converter 400, the mass of the cover is not included in the absorber mass.

SUMMARY

According to aspects illustrated herein, there is provided a torque transmission apparatus, including: a first vibration damper with a first input part arranged to receive torque from an engine, a first output part and at least one first spring engaged with the first input and output parts; and a torque converter including a cover non-rotatably connected to the first output part, an impeller with at least one first blade and an impeller shell non-rotatably connected to the cover, a turbine with at least one second blade and a turbine shell, an output hub and a planetary gear set including a first component non-rotatably connected to the turbine shell or a second component non-rotatably connected to the output hub.

According to aspects illustrated herein, there is provided a torque transmission apparatus, including: a vibration damper with an input part arranged to receive torque from an engine, an output part; and at least one spring engaged with the input and output parts; a torque converter including an impeller with at least one first blade and an impeller shell non-rotatably connected to the cover, a turbine with at least one second blade and a turbine shell, an output hub, a cover non-rotatably connected to the first output part and a planetary gear set including a ring gear non-rotatably connected to the turbine shell and a planetary carrier non-rotatably connected to the output hub.

According to aspects illustrated herein, there is provided a torque transmission apparatus, including: a first vibration damper with a first input part arranged to receive torque from an engine, a first output par; and at least one first spring engaged with the first input and output parts; and a torque converter including an impeller with at least one first blade and an impeller shell non-rotatably connected to the cover, a turbine with at least one second blade and a turbine shell, an output hub, a cover non-rotatably connected to the first output part, a second vibration damper including a second input part non-rotatably connected to the turbine shell, a second output part non-rotatably connected to the ring gear and at least one second spring engaged with the second input and output parts; and a planetary gear set including a ring gear non-rotatably connected to the second output part and a planetary carrier non-rotatably connected to the output hub.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
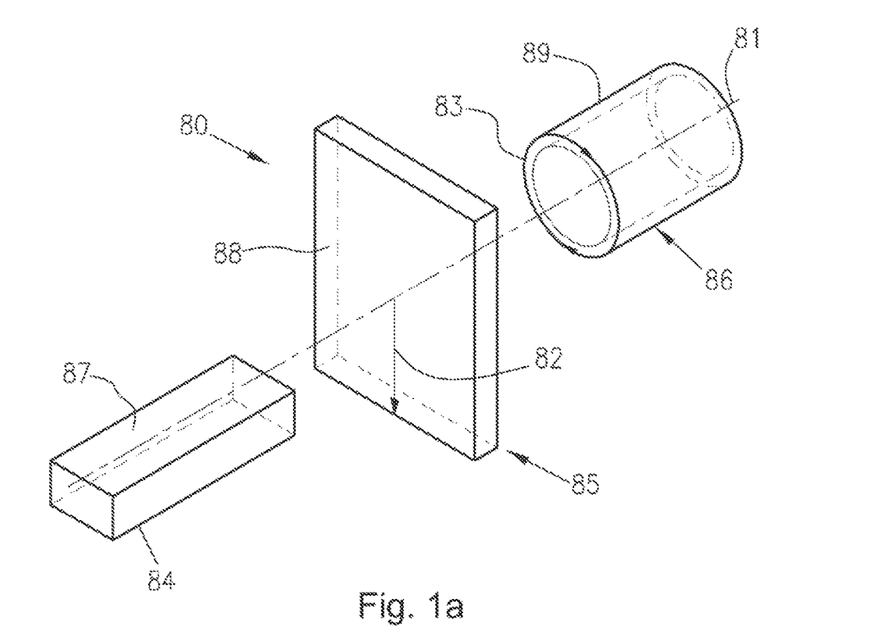
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
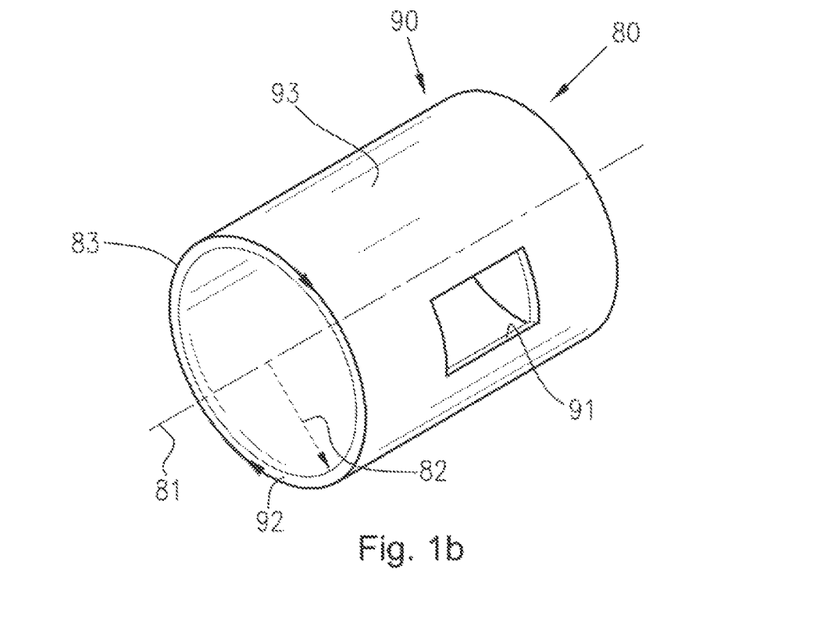
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
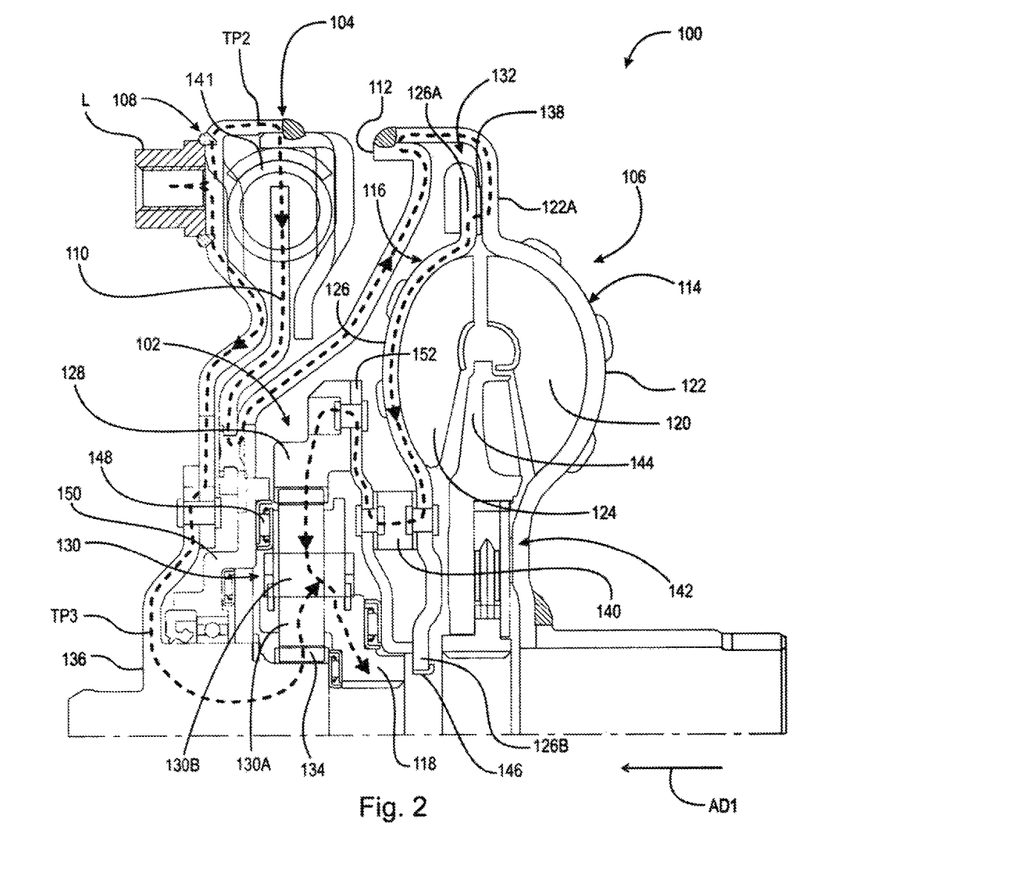
FIG. 2 is a partial cross-sectional view of a torque transmission apparatus including a planetary gear set.

FIG. 2 is a partial cross-sectional view of torque transmission apparatus 100 including planetary gear set 102. Apparatus 100 includes vibration damper 104 and torque converter 106. Damper 104 includes input part, or spring cover, 108 arranged to receive torque from an engine and output part 110. Torque converter 106 includes cover 112 non-rotatably connected to output part 110, impeller 114, turbine 116, and output hub 118. Impeller 114 includes at least one blade 120 and impeller shell 122 non-rotatably connected to the cover. Turbine 116 includes at least one blade 124 and turbine shell 126. Gear set 102 includes component 128 non-rotatably connected to the turbine shell or component 130 non-rotatably connected to the output hub. In an example embodiment, component 128 is non-rotatably connected to the turbine shell and component 130 is non-rotatably connected to the output hub. In an example embodiment, turbine 126 is rotatable with respect to output hub 118.

In an example embodiment, torque converter 106 includes torque converter clutch 132. In an example embodiment, in a torque converter mode, clutch 132 is open and component 128 is at least limitedly rotatable with respect to the impeller shell. In a lock-up mode, clutch 132 is closed and component 128 is non-rotatably connected to the impeller shell.

In an example embodiment, component 128 is a ring gear and component 130 includes a planetary carrier. In an example embodiment, planetary gear set 102 includes component 134 non-rotatably connected to input part 108. In an example embodiment, apparatus includes pilot hub 136 non-rotatably connected to input part 108 and component 134 is non-rotatably connected to hub 136. In an example embodiment, component 128 is a ring gear, component 134 is a sun gear, and component 130 includes planetary gear 137 engaged with ring gear 128 and sun gear 134 and planetary carrier 139 non-rotatably connected to output hub 118.

In an example embodiment, torque converter clutch includes portion 122A of the impeller shell, portion 126A of the turbine shell; and friction material 138. In the lock-up mode, friction material 138 is substantially non-rotatably connected with portions 122A and 126A. By "substantially non-rotatably connected" we mean that the components are non-rotatably connected with the possible exception of nominal slip between components associated with operation of the clutch. In an example embodiment, component 128 is non-rotatably connected to shell 126 with connector 140. In an example embodiment, connector 140 is a leaf spring enabling axial movement between gear set 102 and turbine shell 126. Further details regarding the structure and operations of apparatus 100 are provided infra.

Figure 3:
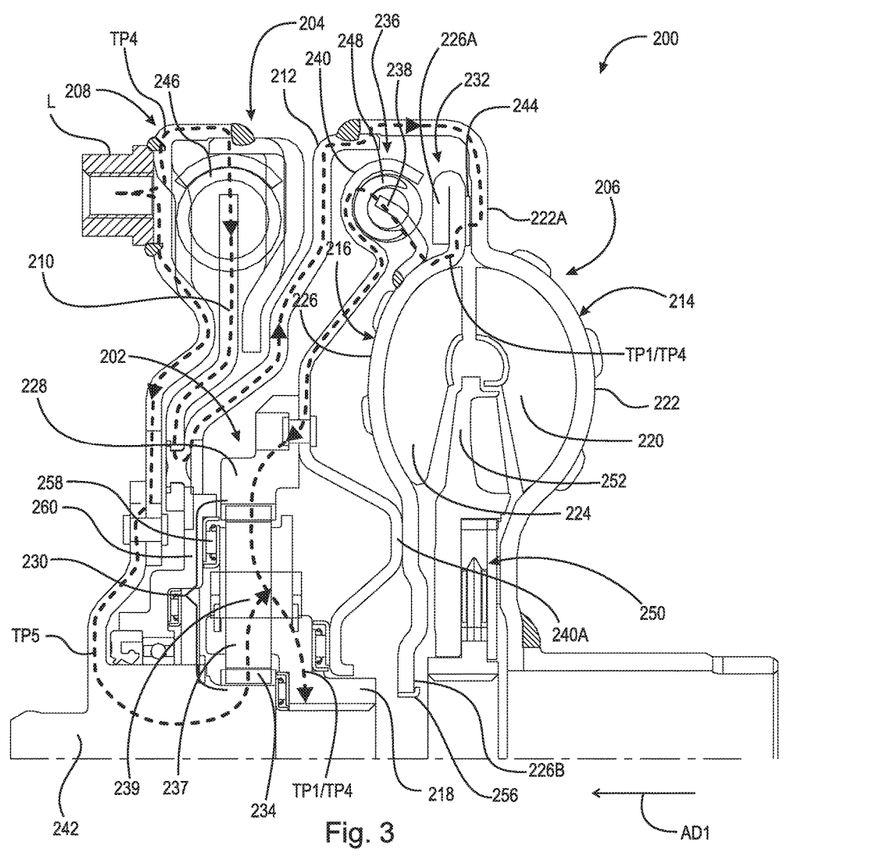
FIG. 3 is a partial cross-sectional view of a torque transmission apparatus including a planetary gear set.

FIG. 3 is a partial cross-sectional view of torque transmission apparatus 200 including planetary gear set 202. Apparatus 200 includes vibration damper 204 and torque converter 206. Damper 204 includes input part, or spring cover, 208 arranged to receive torque from an engine and output part 210. Torque converter 206 includes cover 212 non-rotatably connected to output part 210, impeller 214, turbine 216, and output hub 218. Impeller 214 includes at least one blade 220 and impeller shell 222 non-rotatably connected to the cover. Turbine 216 includes at least one blade 224 and turbine shell 226. Gear set 202 includes component 228 arranged to receive torque from the turbine shell or component 230 non-rotatably connected to the output hub. In an example embodiment, component 228 is arranged to receive torque from the turbine shell and component 230 is non-rotatably connected to the output hub. In an example embodiment, turbine 224 is rotatable with respect to output hub 218.

In an example embodiment, torque converter 206 includes torque converter clutch 232. In an example embodiment, in a torque converter mode, clutch 232 is open and torque path TP1 is formed from turbine shell 226 to output hub 218 through components 228 and 230. Torque path TP1 also is formed in lock-up mode when clutch 232 is closed.

In an example embodiment, planetary gear set 202 includes component 234 non-rotatably connected input part 208. In an example embodiment, torque converter 206 includes vibration damper assembly 236 including input part 238 non-rotatably connected to the turbine shell, and output part 240 non-rotatably connected component 228. In an example embodiment, component 228 is a ring gear, component 230 includes a planetary carrier, and component 234 is a sun gear. In an example embodiment, apparatus 200 includes pilot hub 242 non-rotatably connected to input part 208, and component 234 is non-rotatably connected to hub 242. In an example embodiment, component 230 includes planetary gear 237 engaged with ring gear 228 and sun gear 234 and planetary carrier 239 non-rotatably connected to output hub 218.

In an example embodiment, torque converter clutch includes portion 222A of the impeller shell, portion 226A of the turbine shell; and friction material 244. In the lock-up mode, friction material 244 is substantially non-rotatably connected with portions 222A and 226A. Further details regarding the structure and operations of apparatus 200 are provided infra.

Figure 4A:
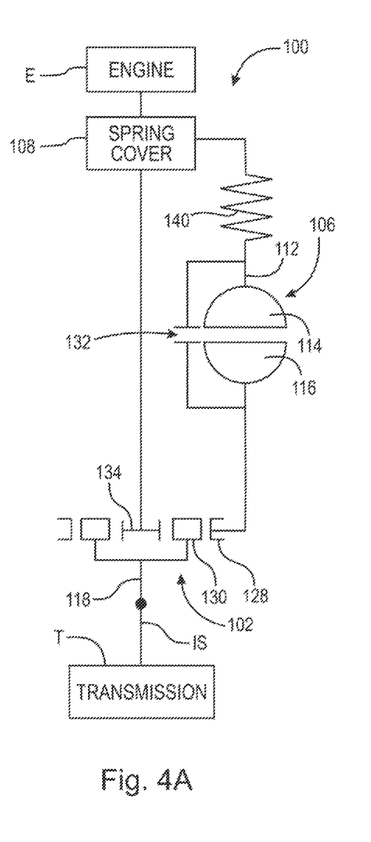
FIGS. 4A, 4B, and 4C are respective schematic representations of torque transmission apparatus including planetary gear sets.
Figure 4B:
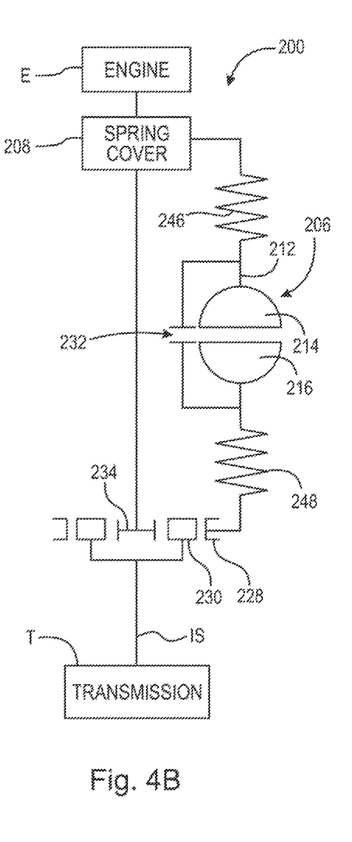
Figure 4C:
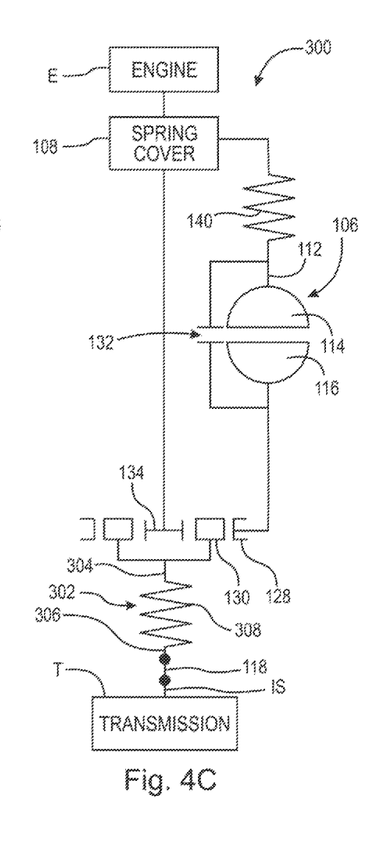

FIGS. 4A, 4B, and 4C are respective schematic representations of torque transmission apparatus including respective planetary gear sets. The following should be viewed in light of FIGS. 2 and 4A. FIG. 4A is a schematic representation of apparatus 100. Damper 104 includes at least one spring 141 engaged with parts 108 and 110. Input part 108 is connected to engine E, for example, by at least one lug L non-rotatably connected to input part 108. Output hub 118 is arranged to non-rotatably engage input shaft IS for transmission T.

In lock-up mode, example torque path TP2 is formed from input part 108 to hub 118 through spring 141, part 110, cover 112, clutch 132, connector 140, ring gear 128, gear 130A, and carrier 130B. In an example embodiment, path TP2 shifts the phase of engine vibrations by a half wavelength. Example torque path TP3 is formed from input part 108 to sun gear 134 through pilot hub 136. Torque path TP3 does not shift the phase of engine vibrations. The supposition of paths TP2 and TP3 in carrier 130B advantageously reduces or removes engine vibration.

In an example embodiment, torque converter 106 includes stator 142 including at least one blade 144. In an example embodiment, torque converter 100 includes bushing 146 in contact with radially innermost end 126B of the turbine shell. Bushing 146 is arranged to contact shaft IS, for example, to radially center the turbine. Connector 140 enables some axial displacement between gear set 102 and the turbine shell. However, thrust bearing 148 and plate 150 axially fixed by cover 112 limit displacement of gear set 102 and the turbine in axial direction AD1.

Advantageously, splitting the input torque at damper 104, outside of torque converter 106, along with the use of planetary gear set 102 results in an increase in the absorber mass associated with operation of torque converter 106. Specifically, along path TP2, the absorber mass for damper 104 and apparatus 100 includes output part 110, cover 112, impeller 120, turbine 124, connector 140, plate 152, and ring gear 128. This is a significant increase when compared to the prior art configurations discussed above, in which, for example, the masses of the respective covers, impellers, and turbines are not included in the respective absorber masses.

In an example embodiment, the function of gear set 102 changes for torque converter mode (clutch 132 is closed). For example, rotation of ring gear 128 is slower than the rotation of sun gear 134, or the rotation of ring gear 128 is opposite the rotation of sung gear 134. In either case, the rotation of ring gear 128 and sun gear 134 advantageously increases the effective stiffness of a fluid circuit in the impeller and turbine.

The following should be viewed in light of FIGS. 3 and 4B. FIG. 4B is a schematic representation of apparatus 200. Damper 204 includes at least one spring 246 engaged with parts 208 and 210. Input part 208 is connected to engine E, for example, by at least one lug L non-rotatably connected to input part 208. Output hub 218 is arranged to non-rotatably engage input shaft IS for transmission T. Damper 236 includes at least one spring 248 engaged with parts 238 and 240.

In lock-up mode, example torque path TP4 includes TP1 and is formed from input part 208 to hub 218. TP4 passes through input part 208, spring 246, output part 210, cover 212, and clutch 232 to join torque path TP1. In an example embodiment, path TP4 shifts the phase of engine vibrations by a half wavelength. Example torque path TP5 is formed from input part 208 to sun gear 234 through pilot hub 242.

Torque path TP5 does not shift the phase of engine vibrations. Therefore, the supposition of paths TP4 and TP5 in carrier 239 advantageously reduces or removes engine vibration.

In an example embodiment, the function of gear set 202 changes for torque converter mode (clutch 232 is closed). For example, rotation of ring gear 228 is slower than the rotation of sun gear 234, or the rotation of ring gear 228 is opposite the rotation of sung gear 234. In either case, the rotation of ring gear 228 and sun gear 234 advantageously increases the effective stiffness of a fluid circuit in the impeller and turbine.

In an example embodiment, torque converter 206 includes stator 250 including at least one blade 252. In an example embodiment, torque converter 200 includes bushing 256 in contact with radially innermost end 226B of the turbine shell. Bushing 256 is arranged to contact shaft IS, for example, to radially center the turbine. In an example embodiment, portion 240A of output part 240 is in contact with, but rotatable, at least limitedly, with respect to turbine shell 226. Portion 240A enables some axial displacement between part 240 and the turbine shell, but also restrains the turbine, in particular, in axial direction AD1. For example, axial displacement of gear set 202 in direction AD1 is blocked by thrust washer 258 and plate 260 axially fixed by cover 212. Therefore, when the turbine displaces in direction AD1 and contacts portion 240A, the axial movement of the turbine is blocked when the movement of gear set 202 is blocked.

Advantageously, splitting the input torque at damper 204, outside of torque converter 206, along with the use of planetary gear set 202 results in an increase in the absorber mass associated with operation of damper 204 and torque converter 206. Specifically, along path TP4, the absorber mass for apparatus 200 includes output part 210, cover 212, impeller 220, turbine 224, damper 236, and ring gear 228. This is a significant increase when compared to the prior art configurations discussed above, in which, for example, the masses of the respective covers, impellers, and turbines are not included in the respective absorber masses.

FIG. 4C is a schematic representation of torque transmission apparatus 300 including a planetary gear set. The discussion for apparatus 100 is applicable to apparatus 300 except as follows. Apparatus 300 includes vibration damper 302 positioned between carrier 130 and output hub 118. Damper 302 includes input part 304 non-rotatably connected to carrier 130, output part 306 non-rotatably connected to hub 118, and at least one spring 308 engaged with parts 304 and 306. The absorber mass for apparatus also is advantageously increased and includes output part 110, cover 112, impeller 120, turbine 124, connector 140, plate 152, and ring gear 128. Additional damping is provided by damper 302.

The following discussion is directed to apparatus 100; however, it should be understood that the discussion also is applicable to apparatus 200 and apparatus 300. Advantageously, damper 104 and gear set 102 increase a torque capacity for torque converter 100, increase torque ratio for torque converter 100 at higher torus speed ratios, and decrease a torus speed ratio for a coupling point (torque ration equal to 1.0) for torque converter 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A torque transmission apparatus, comprising:
   a first vibration damper including:
      a first input part arranged to receive torque from an engine;
      a first output part; and,
      at least one first spring engaged with the first input and output parts; and,
   a torque converter including:
      a cover non-rotatably connected to the first output part;
      an impeller with at least one first blade and an impeller shell non-rotatably connected to the cover;
      a turbine with at least one second blade and a turbine shell;
      an output hub; and,
      a planetary gear set including:
         a first component non-rotatably connected to the turbine shell; or,
         a second component non-rotatably connected to the output hub.

2. The torque transmission apparatus of claim 1, wherein:
   the first component is non-rotatably connected to the turbine shell; and,
   the second component is non-rotatably connected to the output hub.

3. The torque transmission apparatus of claim 2, wherein:
   the first component is a ring gear;
   the second component includes a planetary carrier and at least one planetary gear;
   the planetary gear set includes a sun gear non-rotatably connected to the first input part;
   the planetary gear is engaged with the ring and sun gears; and,
   the planetary carrier non-rotatably connected to the output hub.

4. The torque transmission apparatus of claim 1, wherein:
   the first component is a ring gear; and,
   the second component includes a planetary carrier.

5. The torque transmission apparatus of claim 1, wherein:
   the planetary gear set includes a third component non-rotatably connected to the first input part.

6. The torque transmission apparatus of claim 1, wherein:
   the torque converter includes a torque converter clutch including:
      a portion of the turbine shell;
      a portion of the impeller shell; and,
      friction material; and,
   in a lock-up mode, the friction material is substantially non-rotatably connected with the portion of the turbine shell and the portion of the impeller shell.

7. The torque transmission apparatus of claim 1, wherein the turbine is rotatable with respect to the output hub.

8. The torque transmission apparatus of claim 1, wherein:
   in a torque converter mode the first component is rotatable with respect to the impeller shell; and,
   in a lock-up mode, the first component is non-rotatably connected to the impeller shell.

9. The torque transmission apparatus of claim 1, wherein:
   the torque converter includes a second vibration damper assembly including:
      a second input part non-rotatably connected to the turbine shell;
      a second output part non-rotatably connected to the first component; and,
      at least one second spring engaged with the second input and output parts.

10. The torque transmission apparatus of claim 1, wherein the torque converter includes a bushing in contact with a radially innermost end of the turbine shell and the bushing is arranged to contact an input shaft for a transmission.

11. A torque transmission apparatus, comprising:
    a vibration damper including:
       an input part arranged to receive torque from an engine;
       an output part; and,
       at least one spring engaged with the input and output parts;
    a torque converter including:
       an impeller with at least one first blade and an impeller shell;
       a turbine with at least one second blade and a turbine shell;
       an output hub;
       a cover non-rotatably connected to the output part, the impeller shell non-rotatably connected to the cover; and,
       a planetary gear set including:
          a ring gear non-rotatably connected to the turbine shell; and,
          a planetary carrier non-rotatably connected to the output hub.

12. The torque transmission apparatus of claim 11, wherein the planetary gear set includes:
    a sun gear non-rotatably connected to the input part; and,
    at least one planetary gear:
       connected to the planetary carrier; and,
       engaged with the ring gear and the sun gear.

13. The torque transmission apparatus of claim 11, wherein:
    the torque converter includes a torque converter clutch including:
       a portion of the turbine shell;
       a portion of the impeller shell; and,
       friction material; and,
    in a lock-up mode:
       the friction material is substantially non-rotatably connected with the portion of the turbine shell and the portion of the impeller shell; and,
       the ring gear is non-rotatably connected with the impeller shell.

14. The torque transmission apparatus of claim 11, wherein the turbine is rotatable with respect to the output hub.

15. A torque transmission apparatus, comprising:
    a first vibration damper including:
       a first input part arranged to receive torque from an engine;
       a first output part; and,
       at least one first spring engaged with the first input and output parts; and,
    a torque converter including:
       an impeller with at least one first blade and an impeller shell;
       a turbine with at least one second blade and a turbine shell;
       an output hub;
       a cover non-rotatably connected to the first output part, the impeller shell non-rotatably connected to cover;
       a second vibration damper including:
          a second input part non-rotatably connected to the turbine shell;
          a second output part; and, at least one second spring engaged with the second input and output parts; and, a planetary gear set including:

a ring gear non-rotatably connected to the second output part; and, a planetary carrier non-rotatably connected to the output hub.

16. The torque transmission apparatus of claim 15, wherein the planetary gear set includes:

a sun gear non-rotatably connected to the first input part; and, at least one planetary gear:

connected to the planetary carrier; and, engaged with the ring gear and the sun gear.

17. The torque transmission apparatus of claim 15, wherein:

in a torque converter mode the turbine shell is rotatable with respect to the impeller shell;

in a lock-up mode, the turbine shell is substantially non-rotatably connected to the impeller shell; and, in both the torque converter and lock-up modes, a torque path is formed from the turbine shell to the output hub through the planetary gear set.

18. The torque transmission apparatus of claim 15, wherein:

the torque converter includes a torque converter clutch including:

a portion of the turbine shell;

a portion of the impeller shell; and, friction material; and, in a lock-up mode, the friction material is substantially non-rotatably connected with the portion of the turbine shell and the portion of the impeller shell.

19. The torque transmission apparatus of claim 15, wherein the turbine is rotatable with respect to the output hub.

20. The torque transmission apparatus of claim 15, wherein the second input part includes a portion engaged with the turbine shell and rotatable with respect to the turbine shell.

* * * * *